United States Patent Office 3,449,914
Patented June 17, 1969

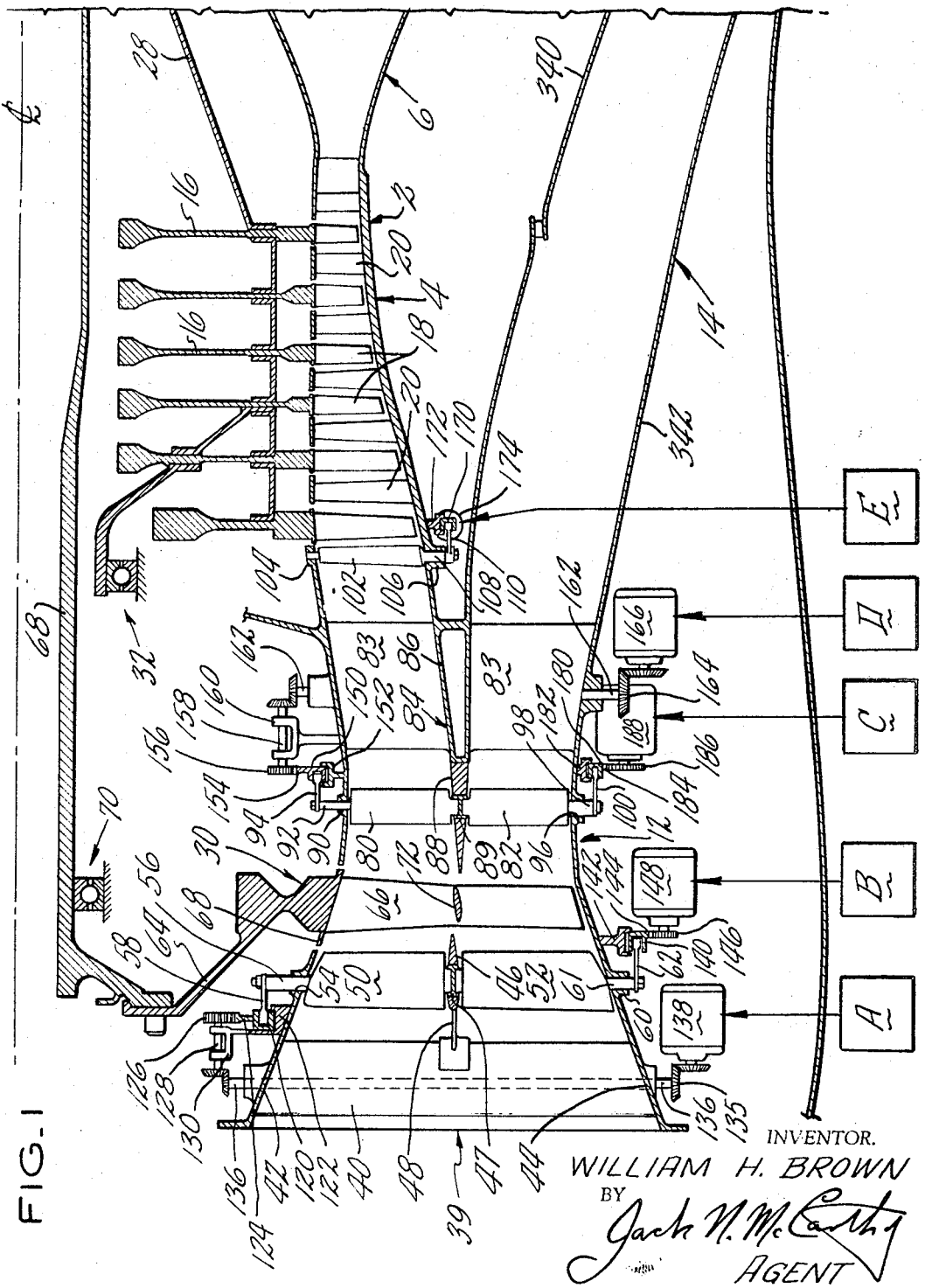

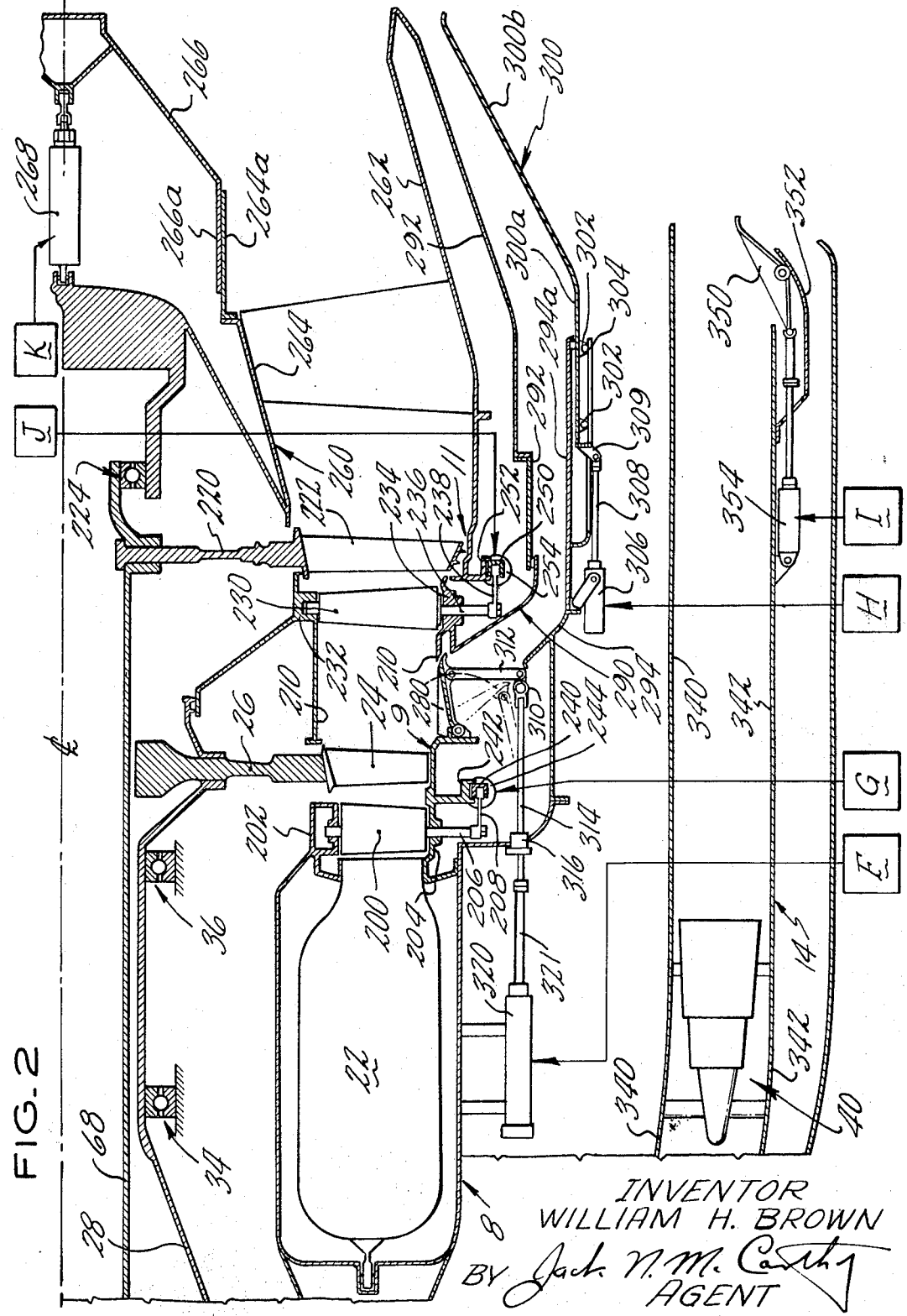

3,449,914
VARIABLE FLOW TURBOFAN ENGINE
William H. Brown, Palm Beach Shores, Fla., assignor to United Aircraft Corporation, East Hartford, Conn., a corporation of Delaware
Filed Dec. 21, 1967, Ser. No. 692,334
Int. Cl. F02k 3/06; F02c 9/02, 3/06
U.S. Cl. 60—225            15 Claims

ABSTRACT OF THE DISCLOSURE

A ducted fan engine having a compressor and first turbine means for driving said compressor with combustion means located therebetween with a fan positioned upstream of the compressor and a second turbine means for driving said fan located downstream of said first turbine means. An annular duct being located around said compressor, said burner combustion means and both turbine means with its inlet also being located downstream of said fan. Vane means being located on each side of said fan for controlling flow through said fan into the compressor and annular duct. Said vane means each being formed having relatively movable inner and outer sections, all of said sections being independently movable one from the other. Variable vane means also being located adjacent the inlet to the compressor. First movable vane means located upstream of said first turbine means and second movable vane means located upstream of said second turbine means. A bypass valve being positioned between the first turbine means and second movable vane means. An outlet being provided for the flow through the fan, compressor, combustion means and turbine means; an outlet being provided for the annular duct; and an outlet being provided for the passage leading from the bypass valve. All of said outlets are variable. Combustion means are located in the annular duct. Means are provided for actuating and controlling the variable vane means and outlets to provide an engine that can successfully perform missions throughout a wide flight spectrum.

Background of the invention

This invention relates to the field of aircraft propulsion wherein an engine incorporates flow control means wherein flow is controlled through a fan to the inlet of (1) a jet engine and (2) an annular duct surrounding said engine. Said fan having variable vane means located forwardly and rearwardly thereof. The turbine means for driving the compressor of said jet engine and said fan also having vane means for controlling flow to said turbine means. A bypass also being provided to control the amount of flow passing through the turbine means driving the fan.

An engine of the general configuration of the engine discussed herein is shown in U.S. Patent No. 3,338,051. It can be seen that to control the ratio of flow between the jet engine and annular duct of said patent, some changes will have to be made. One inventive arrangement is described herein.

Summary of invention

In the arrangement disclosed, an attempt has been made to provide an engine having the capability of large variations in airflow with flight Mach number to match the inlet airflow and exhaust system characteristics. It is also desired to introduce into the turbine means a device for efficiently varying the turbine work to achieve a significant airflow variation. An attempt has been made to reduce subsonic inlet losses and increase the exhaust ejector performance in the transonic Mach number range. By progressively extracting higher percentages of the low pressure turbine gas flow as flight Mach number increases, the engine airflow characteristics can be made to match the aircraft inlet airflow. Improved exhaust nozzle performance can be obtained because of a larger permissible exhaust nozzle area at subsonic and low supersonic Mach numbers.

Brief description of the drawings

FIGURE 1 and FIGURE 2 combine to form a schematic view of a cross section of the longitudinal half of a ducted fan type engine illustrating the invention.

Description of the preferred embodiment

In FIGURES 1 and 2 the ducted fan engine shown comprises a conventional turbojet engine 2 having a compressor section 4, diffuser section 6, burner section 8 and turbine section 9. A fan section 12 is located forwardly of the compressor section 4 and has a part of its exhaust delivered to the inlet of the compressor section. The fan section 12 also exhausts into an annular duct 14 which envelopes the engine 2 to form an additional passage for fluid flow therethrough. This fan section 12 includes a fan 30 driven by a turbine section 11.

The jet engine 2 can be a conventional jet engine such as is well known in the art, for instance, as shown in U.S. Patent No. 2,934,891. This basic construction is one where the compressor section 4 comprises a compressor having a plurality of compressor discs 16 fixed together with compressor blades 18 attached thereto. Stators 20 are positioned adjacent the blades where necessary. The diffuser section 6 directs the outlet of the compressor to the inlet of the burner section 8 which consists of a plurality of burners 22. Exhaust from the burners passes over turbine blades 24 which are mounted in a turbine disc 26 which comprise the rotating parts of the turbine section 9. A hollow shaft 28 connects the turbine disc 26 to the compressor disc 16. The forward part of the compressor disc 16 is mounted for rotation on bearing means at 32 and the hollow shaft 28 is mounted for rotation by bearing means at 34 and 36 adjacent the turbine disc 26.

The fan section 12 includes an annular passageway 39 which decreases in cross-sectional area inwardly to a diffusing portion where it is connected to the inlet of the compressor section 4 and the annular duct 14. A plurality of struts 40 extend radially between inner and outer walls 42 and 44, respectively, of the annular passageway 39 and support an annular bearing ring member 46. This ring member 46 is connected to the struts 40 by a plurality of interconnecting rods 48 fixed to the rearward part of the struts and the forward part of the bearing ring 46.

Just rearwardly of the struts 40 a circumferential set of vanes is located. Each vane is formed of individual vane members 50 and 52 and they are mounted for movement independently of each other. Each inner vane member 50 has its outer end mounted for rotation in one end of a bearing 47 located in the bearing ring member 46 and its inner end mounted for rotation in a boss 54. A plurality of bearings 47 are spaced around the bearing ring member 46 and a plurality of bosses 54 are spaced around the inner wall 42 of the fan section 12. A rod member 56 extends from each vane member 50 through its cooperating boss 54 and has a lever 58 extending from the end thereof which can be moved to rotate each vane member 50. Means for actuating these levers 58 will be hereinafter described.

Each outer vane member 52 has its inner end mounted for rotation in one end of a bearing 47 located in the bearing ring member 46 and its outer end mounted for rotation in a boss 60. A plurality of bosses 60 are spaced around the outer wall 44 of the fan section 12. A rod member 61 extends from each vane member 52 through its cooperating boss 60 and has a lever 62 extending from the end thereof which can be moved to rotate each vane member 52. Means for actuating these levers 62 will be hereinafter described.

The fan 30 is made up of a disc member 64 having a plurality of blades 66 fixed to the outer circumference thereof. An annular member 68 forms a continuation of the inner wall 42. The disc 64 is fixed to the forward end of shaft 68. This shaft 68 extends rearwardly through the hollow shaft 28 towards the turbine section 11. The forward part of the shaft 68 adjacent the disc 64 is mounted for rotation on bearing means located at 70. A mid shroud 72 connects all of the blades 66 and is located approximately in line with the annular ring member 46.

Just rearwardly of the fan blades 66 a second circumferential set of vanes is located. Each vane is formed of individual vane members 80 and 82 and they are mounted for rotation independently of each other, just as the first set of vanes. In the diffusing portion of the fan section 12 a plurality of struts 83 are located and extend radially between the inner wall 42 and outer wall 44. These struts support the splitter member 84 which comprises an annular centrally located member 86 extending between the struts and an annular portion 88 projecting forwardly thereof, said members forming an annular passageway with inner wall 42 which leads to the compressor section 4 and forms with outer wall 44 an annular passageway leading to the annular duct 14. The annular portion 88 also serves as an annular bearing ring member for the mating ends of vanes 80 and 82.

Each inner vane member 80 has its outer end mounted for rotation in one end of a bearing ring 89 located in annular portion 88 and its inner end mounted for rotation in a boss 90. A plurality of bearings 89 are spaced around the annular portion 88 and a plurality of bosses 90 are spaced around the inner wall 42 of the fan section 12. A rod member 92 extends from each vane member 80 through its cooperating boss 90 and has a lever 94 extending from the end thereof which can be moved to rotate each vane member 80. Means for actuating the lever 94 will be hereinafter described.

Each outer van member 82 has its inner end mounted for rotation in one end of a bearing 89 located in annular portion 88 and its outer end mounted for rotation in a boss 96. A plurality of bosses 96 are spaced around the outer wall 44 of the fan section 12. A rod member 98 extends from each vane member 82 through its cooperating boss 96 and has a lever 100 extending from the end thereto which can be moved to rotate each vane member 82. Means for actuating these levers 100 will be hereinafter described.

Just forwardly of the blades 18 of the first compressor stage a third circumferential set of vanes 102 is located. Each vane 102 has its inner end mounted for rotation in a boss 104 and its outer end mounted for rotation in a boss 106. A plurality of bosses 104 extend around the inner wall of the air passage to the compressor and a plurality of bosses 106 extend around the outer wall of the passageway leading to the compressor. A rod member 108 extends from each vane member 102 through its cooperating boss 106 and has a lever 110 extending from the end thereof which can be moved to rotate each vane 102. Means for actuating these levers 110 will be hereinafter described.

The actuating means for levers 58 includes an operating ring 120, said ring 120 being mounted for rotation about track means 122 fixed to the inner side of the wall 42. The free ends of levers 58 are connected to the ring 120 so that movement of the ring 120 in track means 122 rotates all of the levers 58 about their center, the center line of rotational movement of the vane members 50. The inner periphery of the ring 120 has a ring gear 124 fixed thereto with teeth projecting inwardly. A pinion gear 126 which meshes with ring gear 124 is fixed to a shaft 128 which is rotatably mounted in a bracket 130. The bracket 130 is attached to the track means 122. The free end of the shaft 128 has a bevel gear mounted thereon which engages a cooperating bevel gear at an angle of 90° thereto. The second bevel gear is fixedly mounted to the end of a shaft 136 which is rotatably mounted in the strut 40 (see FIG. 1). The other free end of shaft 136 which extends on the outer side of wall 44 has a bevel gear 135 mounted thereon. A motor 138 has an output shaft with a bevel drive gear which engages the bevel gear 135. Motor 138 is controlled by control means A.

The actuating means for levers 62 includes an operating ring 140, said ring 140 being mounted for rotation about track means 142 fixed to the outer side of the wall 44. The free ends of the levers 62 are connected to the ring 140 so that movement of the ring 140 in track means 142 rotates all of the levers 62 about their center the center line of rotational movement of the vane members 52. The outer periphery of the ring 140 has a ring gear 144 fixed thereto with teeth projecting outwardly. A pinion gear 146 meshes with ring gear 144 and is fixed to the output shaft of a motor 148. Motor 148 is controlled by control means B.

The actuating means for levers 94 includes an operating ring 150, said ring 150 being mounted for rotation about track means 152 fixed to the inner side of the wall 42. The free ends of the levers 94 are connected to the ring 150 so that movement of the ring 150 in track means 152 rotates all of the levers 94 about their center, the center line of rotational movement of the vane members 80. The inner periphery of the ring 150 has a ring gear 154 fixed thereto with teeth projecting inwardly. A pinion gear 156 which meshes with ring gear 154 is fixed to a shaft 158 which is rotatably mounted in a bracket 160. The bracket 160 is attached to the wall 42. The free end of the shaft 158 has a bevel gear mounted thereon which engages a cooperating bevel gear at an angle of 90° thereto. The second bevel gear is fixedly mounted to the end of a shaft 162 which is rotatably mounted in the strut 83 (see FIG. 1). The other free end of shaft 136 which extends on the outer side of wall 44 has a bevel gear 164 mounted thereon. A motor 166 has an output shaft with a bevel drive gear which engages the bevel gear 164. Motor 166 is controlled by control means D.

The actuating means for levers 100 includes an operating ring 180, said ring 180 being mounted for rotation about track means 182 fixed to the outer side of the wall 44. The free ends of levers 100 are connected to the ring 180 so that movement of the ring 180 in track means 182 rotates all of the levers 62 about their center, the center line of rotational movement of the vane members 82. The outer periphery of the ring 180 has a ring gear 184 fixed thereto with teeth projecting outwardly. The pinion gear 186 meshes with ring gear 184 and is fixed to the output shaft of a motor 188. Motor 188 is controlled by control means C.

The actuating means for levers 110 includes an operating ring 170. said ring 170 being mounted for rotation about track means 172 fixed to the casing of the compressor section 4. The free ends of the levers 110 are connected to the ring 170 so that movement of the ring 170 in track means 172 rotates all of the levers 110 about their center, the center line of rotational movement of the vane 102. A motor 174 is connected by linkage to the ring 170 to move it. Motor 174 is controlled by control means E.

Just rearwardly of the downstream exit from the burners 22 and just upstream of the turbine blades 24 a fourth circumferential set of vanes 200 is located. Each vane 200 has its inner end mounted for rotation in a ring member 202 and its outer end mounted for rotation in a ring member 204. A plurality of vane supporting means extend around the inner ring member 202 and the outer ring member 204. A rod member 206 extends from each vane member 200 through outer ring member 204 and has a lever 208 extending from the end thereof which can be moved to rotate each vane 200. Means for actuating these levers 208 will be hereinafter described.

A short annular passageway 210 extends between the downstream side of blades 24 to the inlet of the turbine section 11. The turbine section 11 comprises a turbine disc 220 on which blades 222 are mounted. The disc 220 is fixedly attached adjacent the rear end of the shaft 68. The rearward part of the shaft 68 adjacent the disc 220 is mounted for rotation on bearing means located at 224. The turbine section 11 also includes a fifth circumferential set of vanes 230 located just forwardly thereof and aft of the passageway 210. Each vane 230 has its inner end mounted for rotation in a ring member 232 and its outer end mounted for rotation in a ring member 234. A plurality of vane supporting means extend around the inner ring 232 and outer ring member 234. A rod member 236 extends from each vane member 230 through outer ring member 234 and has a lever 238 extending from the end thereof which can be moved to rotate each vane 230. Means for actuating these levers 238 will be hereinafter described.

The actuating means for levers 208 includes an operating ring 240, said ring 240 being mounted for rotation about track means 242 fixed to the outer casing of the turbine section 9. The free ends of the levers 208 are connected to the ring 240 so that movement of the ring 240 in track means 242 rotates all of the levers 208 about their center, the center line of rotational movement of the vane members 200. A motor 244 is connected by linkage to the ring 240 to move it. Motor 244 is controlled by control means G.

The actuating means for levers 238 includes an operating ring 250, said ring 250 being mounted for rotation about track means 252 fixed to the outer casing of the turbine section 11. The free ends of the levers 238 are connected to the ring 250 so that movement of the ring 250 in track means 252 rotates all of the levers 236 about their center, the center line of rotational movement of the vane members 230. A motor 254 is connected by linkage to the ring 250 to move it. Motor 254 is controlled by control means J.

An annular passageway 260 extends rearwardly of the rearward end of the turbine section 11 with its outer wall 262 ending in a fixed opening while the end of the inner wall 264 has an axial movable plug 266 associated therewith to control the exit opening of the passageway 260. The rear portion of the inner wall 264 has a cylindrical section 264a and the forward portion of the plug 266 has a cylindrical section 266a mounted for slidable engagement therewith. A cylinder and piston unit 268 is connected between the plug 266 and fixed structure of the engine to provide for relative axial movement of the plug with respect to the annular passageway 260 so that its movement varies the exit area between the plug and the outer wall 262. This nozzle means is included in the control of the primary flow through the turbine section 11. Cylinder and piston unit 268 is controlled by control means K.

The outer wall of the short annular passageway 210 between turbine section 9 and turbine section 11 is formed having a plurality of flaps or valve members 280 mounted therearound for movement between a closed position wherein the flaps form a solid outer wall with the fixed part of passageway 210 and an open position where they form part of a wall of an annular bypass passageway 290. Bypass passageway 290 is formed having an annular inner wall 292 and an outer annular wall 294. The flaps or valve members 280 are merely movable between openings in the outer wall of the annular member 210 and openings in the outer wall of the annular member 210 and openings in the outer wall 294 of the annular bypass passageway 290.

The rearward end of inner wall 292 of passageway 290 is fixed to the rearward end of outer wall 262 of passageway 260. The rear part of outer wall 294 is formed having a cylindrical section 294a. The annular shroud member 300 is formed having a cylindrical section 300a which is mounted for slidable engagement around cylindrical section 294a. The shroud 300 is also formed having a convergent section 300b. The annular shroud 300 has a plurality of pairs of guide members 302 projecting therefrom which are guided in a plurality of track means 304. A plurality of cylinder and piston units 306 are attached to the outer wall 294 and each is connected by a piston rod 308 to a cooperating bracket 309 on the forward end of the shroud 300. The cylinder and piston units 306 can axially move the annular shroud 300 so as to vary the exit area between the rear end of the shroud member and the rear end of the inner wall 292. This nozzle means is included in the control of bypass flow from the passageway 210 between the turbine section 9 and turbine section 11. Cylinder and piston units 306 are controlled by control means H.

Each flap 280 is hinged at its forward end to the rear of the casing of turbine section 9. A ring member 310 is located around the valve members 280 with linkage 312 connecting the flaps to the ring member. A plurality of actuating rods 314 extend from ring member 310 about its circumference and extend each through a guide member 316. Guide members 316 are fixed to the casing of the turbine section 9. A plurality of cylinder and piston units 320 are attached to the burner section 8 and each is connected by a piston rod 321 to a cooperating actuating rod 314. Cylinder and piston units 320 are controlled by control means F.

Annular duct 14 is formed having an inner wall 340 and an outer wall 342. The annular duct 14 includes a burner 40 and fuel control means (not shown) to provide additional thrust. The inner wall 340 of the annular duct ends having a fixed edge. The free end of 342 is formed having a plurality of flaps 350 mounted for movement in track members 352 positioned around the duct 14. A plurality of cylinder and piston units 354 cooperate to move the flaps 350 between an open and closed position with respect to the fixed rearward edge of inner wall 340. The nozzle means can be of any type desired. Cylinder and piston units 354 are controlled by control means I.

The various control means A–K can each be constructed to put out a desired signal upon the scheduling of desired parameters of the engine to predeterminately position the vane members 50, 52, 80 and 82; vanes 102, 200 and 230; and area varying means 280, 266, 300 and 350. For example, the position of the vane members 50, 52, 80 and 82 could be scheduled as a function of fan corrected rotor speed and engine inlet temperature. Each control means should have a position feedback from the vane member which it operates so that it can be ascertained whether or not the position called for by the control means is obtained. The variable inlet guide vane 102 to the compressor section 4 is provided to give a good high compressor surge line and to provide good matching characteristics of the high compressor with the fan. The annular position of this vane could be scheduled as a function of high compressor corrected rotor speed and the temperature at the inlet of the compressor.

The variable high pressure turbine inlet guide vane 200 is incorporated to aid in obtaining good high compressor performance which contributes toward good overall engine performance. These guide vanes 200 can be positioned as a function of high compressor corrected rotor speed, high pressure compressor pressure ratio and engine inlet temperature. This can be done by programming the control to choose a desired high pressure compressor pressure ratio from the known values of high compressor corrected rotor speed and engine inlet temperature and then matching that reference high pressure compressor pressure with the actual high pressure compressor pressure and using the error to set the angle of the vanes 200.

The low pressure turbine bypass system comprises two variable areas in series, area No. 1 connecting passage 210 to the inlet of the bypass passage 290 and being controlled by the flaps 280 and area No. 2 being at the exit of the bypass passage 290 and being controlled by the movable shroud 300. The area No. 1 controlled by the flaps 280 could be opened completely by engine inlet temperature when the engine enters the variable bypass ratio regime. The amount of flow that bypasses the low pressure turbine would then be controlled by the movable shroud 300. This area No. 2 is in a position to provide thrust from the bypassed area. This is one reason for providing a variable area at this point. The shroud 300 can be positioned as a function of fan corrected rotor speed and engine inlet temperature, its schedule being derived by the fact that as the engine makes the transition from turbofan to turbojet, the flow conditions into the high pressure compressor must be maintained to provide a good fan-high compressor match.

The low pressure turbine inlet guide vanes 230 have been made variable in order to maintain constant work across the high pressure turbine when the low pressure turbine bypass area No. 2 is varied by movement of the shroud 300. Therefore, the control for the low pressure turbine inlet guide vanes 230 has been scheduled so that the vanes are angularly positioned as a function of the bypass area No. 2. As area No. 2 increases, the low pressure turbine inlet guide vanes close so that the effective flow area between the two stays constant, thus the work of the high pressure turbine stays constant.

A variable primary nozzle is provided at the exit of passage 260 to provide a means of controlling the work delivered to the fan and to help increase engine airflow when necessary and helps reduce inlet drag due to air spillage. The plug 266 can be positioned as a function of engine inlet temperature to control the primary nozzle area.

A variable duct nozzle are is provided at the exit of duct 14 to produce a constant corrected total engine airflow as a function of engine inlet temperature. It maintains this function while the engine is in the turbo-fan configuration and also if the engine is in the duct burning mode. This control means could be scheduled so that a reading of the known values of high pressure compressor corrected rotor speed and engine inlet temperature would show a desired duct airflow parameter. This duct airflow parameter could then be compared with the actual duct airflow parameter and the error could be used to properly position the flaps 350.

It must be remember that other specific mechanisms can be used to angularly position the variable vanes and actuate the area varying means. If desired, other engine parameters can be used to provide for a scheduling of the positioning of the vanes and area varying means.

I claim:
1. A ducted fan engine including:
 (a) a turbojet engine,
 (b) a fan mounted for rotation forwardly of said engine,
 (c) turbine means mounted rearwardly of said turbojet engine for receiving exhaust from said engine,
 (d) said turbine means being drivingly connected to said fan,
 (e) duct mean positioned around said turbojet engine,
 (f) the outlet of said fan being connected to the inlet of said turbojet engine and the inlet of said duct means,
 (g) vane means located at the inlet to said fan,
 (h) vane means located at the exit from said fan,
 (i) each of said vane means having vanes formed of two sections along their length, each section being independently movable with respect to the other,
 (j) the inner sections of said vane means controlling flow to said turbojet engine and the outer section of said vane means controlling flow to said duct means,
 (k) means for bleeding off the exhaust from said turbojet engine upstream of said turbine means for controlling the output of said turbine means.
2. A combination as set forth in claim 1 in which:
 (l) vane means are located at the inlet to said turbine means downstream of said means for bleeding off the exhaust from said jet engine.
3. A combination as set forth in claim 1 in which:
 (l) said means for bleeding of the exhaust includes a passageway extending rearwardly between said turbine means and said annular duct.
4. A combination as set forth in claim 3 in which:
 (m) said means for bleeding off the exhaust includes valve means at the entrance of said passageway.
5. A combination as set forth in claim 4 in which:
 (n) said means for bleeding off the exhaust includes nozzle means at the exit of said passageway.
6. A combination as set forth in claim 1 wherein:
 (l) said turbine means exhausts into a passageway extending rearwardly thereof,
 (m) said passageway has nozzle means located at the exit thereof.
7. A combination as set forth in claim 1 wherein:
 (l) said annular duct has combustion means,
 (m) said annular duct has nozzle means at the exit thereof.
8. A ducted fan engine including:
 (a) a turbojet engine including compressor means, combustion means and first turbine means,
  (1) said first turbine means driving said compressor,
 (b) duct means positioned around said turbojet engine,
 (c) a fan mounted forwardly of said turbojet engine and duct means,
  (1) said fan including a housing having a plurality of blades mounted therein for rotation,
  (2) said fan having first vane means located upstream of said blades and second vane means located downstream of said blades, each of said first and second vane means having vanes formed of two sections along their length, each section being independently variable with respect to the other,
 (d) first passage means connecting the outlet of said fan to the inlet of said compressor and the inlet of said duct means,
 (e) second turbine means drivingly connected to the blades of said fan,
 (f) second passage means connecting the exit of said first turbine means with the inlet to said second turbine means,
 (g) an exhaust passageway connected to the exit of said second turbine means,
 (h) third passage means connected to said second passage means,
 (i) valve means located at the connection of said third passage means to said second passage means.
9. A combination as set forth in claim 8 in which:
 (j) said third passage means has means for varying the exit thereof.
10. A combination as set forth in claim 8 in which:
 (j) variable vanes are located at the inlet to said second turbine means.
11. A combination as set forth in claim 10 in which:
 (k) said third passage means has means for varying the exit thereof.
12. A combination as set forth in claim 11 in which:
 (l) variable vanes are located at the inlet to said first turbine means.
13. A combination as set forth in claim 8 in which:
 (j) said duct means has combustion means therein,
 (k) said duct means has means for varying the exit thereof.

14. A combination as set forth in claim 12 in which:
(m) said third passage means has means for varying the exit thereof,
(n) said duct means has combustion means therein,
(o) said duct means has means for varying the exit thereof.

15. A combination as set forth in claim 8 in which:
(j) an anular splitter means extends forwardly between the inlets to the turbojet engine and duct means,
(k) each vane of said second vane means has the adjacent ends of its two sections mounted for movement in said annular splitter means.

References Cited

UNITED STATES PATENTS

| | | | |
|---|---|---|---|
| 2,503.006 | 4/1950 | Stalker | 60—226 |
| 2,672,726 | 3/1954 | Wolf | 60—226 |
| 2,920,843 | 1/1960 | Ferri | 60—224 |
| 3,375,996 | 4/1968 | Wilde | 60—226 |

CARLTON R. CROYLE, *Primary Examiner.*

D. HART, *Assistant Examiner.*

U.S. Cl. X.R.

60—39.16, 39.25; 230—122